April 1, 1924. Re. 15,807

W. T. HOLMES

SPEED REGULATING SYSTEM FOR ELECTRIC MOTORS

Original Filed Aug. 29, 1922

Inventor
William T. Holmes

By Robert Watson

Attorney

Reissued Apr. 1, 1924. Re. 15,807

UNITED STATES PATENT OFFICE.

WILLIAM T. HOLMES, OF BALTIMORE, MARYLAND, ASSIGNOR TO MONITOR CONTROLLER COMPANY, OF BALTIMORE, MARYLAND, A CORPORATION OF MARYLAND.

SPEED-REGULATING SYSTEM FOR ELECTRIC MOTORS.

Original No. 1,479,664, dated January 1, 1924, Serial No. 584,956, filed August 29, 1922. Application for reissue filed January 29, 1924. Serial No. 689,348.

*To all whom it may concern:*

Be it known that I, WILLIAM T. HOLMES, a citizen of the United States, residing at Baltimore, in the State of Maryland, have invented certain new and useful Improvements in Speed-Regulating Systems for Electric Motors, of which the following is a specification.

This invention relates to a remote control speed regulating system for electric motors, whereby, by means of push button switches, the motor may be started, stopped, or operated at any desired speed.

In carrying out the invention, I provide a regulating resistance in the armature circuit of the motor, a series of electro-magnetic contactors, one, a main contactor, for operatively connecting the motor to the supply circuit, and the others for cutting in and out successive sections of the resistance. The magnets of these contactors are controlled by a corresponding series of relays. The relay which controls the circuit of the magnet of the main contactor is itself controlled by start and stop push button switches, by the operation of which the motor may be started and stopped, and the relays which control the speed regulating contactors are controlled by a retarded electro-magnetic accelerating switch which closes the magnet circuits of the relays in succession, to cause the acceleration of the motor, and a retarded electro-magnetic decelerating switch, which opens the magnet circuits of the relays in the reverse order, to decelerate the motor. The magnets of the accelerating and decelerating switches are, in turn, controlled by push button switches, through the operation of which the motor may be brought to any desired speed. The relays are provided with holding circuits for their magnets, whereby when one or more of the relay switches have been closed by the actuation of the accelerating switch, to operate the motor at a given speed, these relays and the said regulating contactors which they control will remain closed until the decelerating switch is operated, when they will be released in succession to lower the motor speed.

In the accompanying drawing,

Fig. 2 is a side view of one of the relays.

Figure 1:
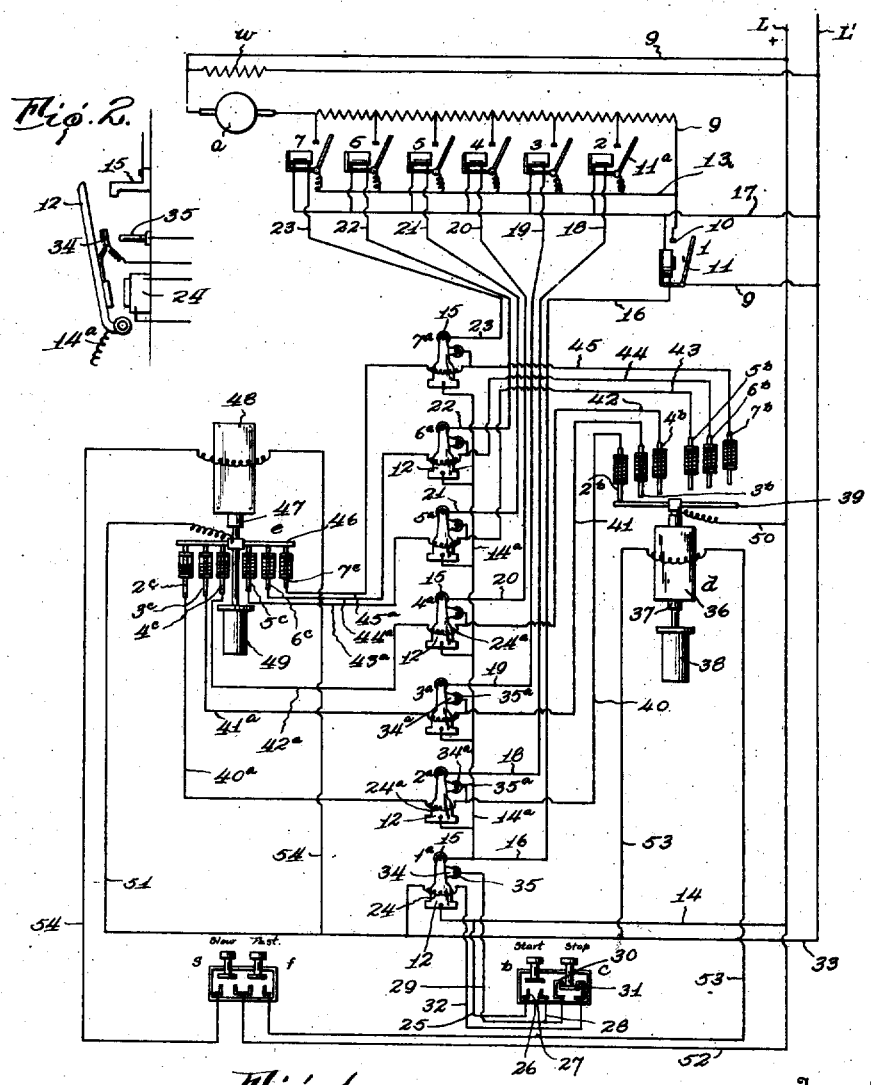
Fig. 1 is a diagram illustrating the invention.

Referring to the drawing, *a* indicates the armature of an electric motor, *w* its field winding, and *r* indicates a starting and regulating resistance in the armature circuit. A main electro-magnetic contactor, for connecting the armature to the supply circuit through all of the resistance, is shown at 1, and similar speed regulating contactors, for cutting successive sections of the resistance out of the armature circuit, are indicated by the numerals 2–7, inclusive. These contactors are normally open and remain closed only so long as their magnets are energized. The circuits of the magnets of the several contactors 1—7 are controlled by relays $1^a$—$7^a$, respectively. The relay $1^a$ which controls the operation of the main contactor 1, for starting and stopping the motor, is controlled by circuits in which are arranged start and stop push button switches *b* and *c*, and the relays $2^a$, $3^a$, etc., which control the speed regulating contactors 2, 3, etc., have circuits which are closed in succession by an electro-magnetic accelerating switch *d*, and opened in the reverse order by an electro-magnetic decelerating switch *e*. The accelerating switch is controlled in its operation by a circuit which includes a push button switch *f*, and the decelerating switch is controlled in its action by a circuit which includes the push button switch *s*.

Referring more particularly to the circuits, the supply wires are indicated at L, L′, and the armature circuit of the motor is indicated at 9, the latter extending from the wire L to the motor armature, thence through the resistance *r* to the stationary contact 10 of the main contactor 1, thence through the armature 11 of said contactor to the supply wire L′. When the contactor 1 is closed, the motor will start with all of the resistance in circuit, and when the switch is opened, the motor will stop. The armatures $11^a$ of the speed regulating contactors 2, 3, 4, etc., are connected by conductor 13 to the conductor 9, between the resistance and the contactor 1, so that upon the progressive closure of these contactors, successive portions of the resistance will be shunted from the armature circuit.

The armature 12 of the relay $1^a$ is connected to the side L of the supply circuit by conductor 14, and this armature is adapted to engage a contact 15, which latter is connected by conductor $14^a$ to the armatures 12 of all of the relays $2^a$, $3^a$, etc. Thus, when the relay $1^a$ is closed, the armatures of all the other relays will be connected, through conductors $14^a$ and 14 with the side L of the supply circuit. The stationary contacts 15 of the relays are separately connected to the coils of the contactors 1—7. Thus, the stationary contact of relay $1^a$ is connected by conductor 16 to the coil of the main contactor 1, and thence through conductor 17 to the side L′ of the supply circuit, and the stationary contact of relay $2^a$ is connected by conductor 18 to the coil of contactor 2, and thence to the side L′ of the supply circuit through conductor 17, which is the common return wire for the several contactor coils. Similarly, the stationary contacts of relays $3^a$—$7^a$, inclusive, are connected by conductors 18—23 to the coils of the contactors 3—7, respectively, and thence through the common conductor 17 to the supply wire L′.

It will be evident that if the relay $1^a$ is closed, the contactor 1 will close the armature circuit of the motor, and if the relays $2^a$, $3^a$, etc., be then closed in succession, the corresponding contactors 2, 3, etc., will close in succession and cut out successive portions of the resistance from the armature circuit, and that if the relays $2^a$—$7^a$ open in the reverse order, the resistance sections will be successively included in the armature circuit.

The magnet coil 24 of the relay $1^a$ is included in a circuit which extends from the supply wire L through conductor 14 and conductor 25 to the contact 26 of the normally open push button switch *b*, thence through said switch to contact 27 and connection 28 to conductor 29, which is connected to contact 30 of the normally closed push button switch *c*, thence through contact 31 of the latter switch and conductor 32 to the coil 24, and thence through conductor 33 to supply wire L′. When the switch *b* is closed, the coil of relay $1^a$ will be energized and the relay will operate to close the circuit of the magnet of the main contactor 1. In order to keep the relay switch $1^a$ closed after the push button switch *b* is released, a holding circuit for the magnet is provided and this circuit is closed by the closing movement of the relay armature. As shown, the relay is provided with an auxiliary switch comprising a contact 34 on the rocking armature 12, adapted to engage a stationary contact 35 when the armature is moved to its closed position. The holding circuit for the coil 24 extends from supply wire L, through conductor 14 to the armature 12, thence through the auxiliary switch contacts 34 and 35 to conductor 29, thence through the closed push button switch *c* and conductor 32 to the coil, and thence through conductor 33 to the side L′ of the supply circuit. It will be evident from this description that momentary closure of the push button switch *b* will cause the relay $1^a$ to close its own holding circuit through the normally closed push button switch *c*. Hence, after the release of the switch *b*, the relay will remain closed until the holding circuit is broken, which is accomplished by pressing the push button switch *c* to open position. Immediately upon opening the holding circuit, the relay armature falls back by gravity, leaving the circuits which it controls open. In closing, the relay $1^a$ closes the circuit of the main contactor 1, and connects the armatures 12 of the other relays to the side L of the supply circuit through conductors 14 and $14^a$.

The switches *b* and *c* may, for convenience, be termed starting and stopping switches, respectively, since the functions of these switches are to cause the starting and stopping of the motor.

The coils $24^a$ of the several relays $2^a$, $3^a$, etc., are provided with holding circuits and these circuits extend through auxiliary switches on the relays comprising movable and stationary contacts $34^a$ and $35^a$, similar to the contacts 34 and 35 on the relay $1^a$. The circuits of the coils $24^a$ are initially closed by the accelerating switch *d*, which is normally open, and these circuits extend through the decelerating switch *e* which is normally closed. The accelerating switch *d* comprises a solenoid 36, having one end of its core 37 connected to a dashpot 38 and having a contact bar 39 mounted on the opposite end of the core. Above this contact bar are arranged, at successively greater distances from the bar, a series of spring-pressed contacts $2^b$, $3^b$, $4^b$, $5^b$, $6^b$, and $7^b$, and these contacts are connected to the coils $24^a$ of the several relays $2^a$, $3^a$, etc., by conductors 40, 41, 42, 43, 44, and 45, respectively. The other terminals of these coils are connected by conductors $40^a$, $41^a$, $42^a$, $43^a$, $44^a$, and $45^a$, to spring pressed contacts $2^c$, $3^c$, $4^c$, $5^c$, $6^c$, and $7^c$, respectively, on the decelerating switch *e*. The decelerating switch comprises these contacts and a contact bar 46 which is connected to the core 47 of a solenoid 48. A dashpot 49 is also connected to the core of the solenoid. The spring-pressed contacts $2^c$, $3^c$, $4^c$, etc. are of progressively decreasing length and the bar 46 normally rests upon all of the contacts. When the solenoid is energized, the contact bar is raised, retarded by the dashpot, and breaks the relay circuits in succession, first leaving the contact $7^c$, then the contacts $6^c$, $5^c$, etc. The contact bar 39 on the accelerating switch is connected to the supply circuit by conductor 50, and the contact bar 46 of the decelerating switch is connected to the opposite side of the supply circuit through conductors 51 and 33.

It will be seen that if the solenoid of the accelerating switch is energized, the contact bar thereon will connect the coils of the relays $2^a$, $3^a$, $4^a$, etc., successively to one side of the supply circuit, and as these coils are normally connected to the other side of the supply circuit through the decelerating switch, which is normally closed, these relay switches will close in succession and the speed regulating contactors, controlled by the separate relays, will close in succession and cause the acceleration of the motor. Each relay as it closes will complete a holding circuit for its magnet coil in shunt to the accelerating switch. Thus, when the relay $2^a$ is closed by the actuation of the accelerating switch, the auxiliary contacts $34^a$ and $35^a$ of the relay connect the supply wire L through conductor 14, conductor $14^a$ and said contacts to one terminal of the coil $24^a$, and from thence the circuit is continued through conductor $40^a$, switch *e*, and conductors 51 and 33 to the supply wire L′. Hence, after closure of this relay switch, if the contact bar 39 is allowed to move downward out of engagement with the contact $2^b$, the circuit through the magnet coil of relay $2^a$ will still be maintained. The circuit connections of the other relays $3^a$, $4^a$, etc., in the series are alike and it will be evident that each relay, when closed through the actuation of the accelerator switch, will remain closed after the contact bar of said switch has been allowed to drop downward and open the circuit to the relay which it initially made. After the relays have closed, if the contact bar 46 of decelerator switch *e* is moved upward, it will first leave the spring contact $7^c$ and thereby open the magnet circuit of the relay $7^a$, and as the bar moves upward, it will leave the contacts $6^c$, $5^c$, $4^c$, etc., in succession and thereby interrupt the magnet circuits of the relays $6^a$, $5^a$, $4^a$, etc., in succession.

The solenoid of the accelerating switch *d* is controlled by the push button switch *f*, which is normally open. As shown, a conductor 52 leads from the side L of the supply circuit to one contact of the push button switch *f*, and from the other contact a conductor 53 leads to the coil of the solenoid 36 and thence to the conductor 33 which is connected to the opposite side L′ of the supply circuit. Similarly, the coil of solenoid 48 of the decelerating switch *e* is controlled by the normally open push button switch *s*. The circuit for the solenoid 48 extends from the side L of the supply circuit through conductor 52 to one contact of the switch *s*, thence from the other contact of said switch through conductor 54 to the solenoid coil and to conductor 33 and thence to the supply wire L′.

The operation of the system is as follows: In order to start the motor, the operator momentarily closes the start switch *b* and this causes the relay $1^a$ to close. This relay closes the circuit through the magnet of the main contactor 1 and this contactor closes the armature circuit of the motor through the entire resistance. The relay also connects the armatures of the other relays to the side L of the supply circuit and closes its own holding circuit and remains in closed position. For stopping the motor the operator depresses the stop push button switch *c* and this interrupts the circuits through the coil of the relay $1^a$ and the latter drops to open position, thereby opening the circuit through the coil of the main contactor 1, which contactor opens the armature circuit, causing the motor to stop. The other relays are controlled by the accelerating and decelerating switches. If, after the motor has been started by the closure of the relay $1^a$, the operator desires to accelerate the speed, he presses the fast push button switch *f* to closed position, thereby closing the circuit through the solenoid of the accelerating switch *d* and this solenoid causes the contact bar 39 to move slowly upward as long as the push button switch is closed. In moving upward it closes the control circuits of the relays $2^a$, $3^a$, etc., in succession and these relays immediately operate to close their own holding circuits and also to close the circuits of the contactors 2, 3, etc., in succession. If the operator desires to have the motor run at full speed, he holds the push button switch *f* closed until the accelerator switch has closed the control circuits of all the relays, and this, in turn, will close the circuits of all the speed regulating contactors and the latter will operate to cut out all of the resistance in the armature circuit of the motor. If he desires to run at an intermediate speed, the push button switch *f* will be released after the accelerating switch has closed the control circuits of a sufficient number of the relays to give the desired speed. When the operator releases the push button switch *f*, the solenoid of the accelerator switch becomes de-energized and the contact bar 39 moves downward away from the control circuit contacts, but the relays which have been actuated remain in their closed positions because the auxiliary switches thereon have completed the holding circuits in shunt to the contacts of the accelerator switch. If the motor is running at full speed or an intermediate speed and the operator desires to cause the motor to run at a lower speed he depresses the slow push button switch *s* and this energizes the solenoid coil of the decelerating switch *e*. This solenoid moves the contact bar 46 slowly upward and the circuits through the magnets of the relays are thereby opened in the reverse order to that in which they were closed by the accelerating switch. The relays will drop to their open positions, thereby opening the circuits of the speed regulating contactors in reverse order to that in which they were closed by the actuation of the accelerating switch. Any desired motor speed can be attained by manipulating the fast and slow push button switches.

To stop the motor, the stop push button *c* is pressed, and this opens the holding circuit of the relay $1^a$, and this relay opens the circuit through the main contactor and also disconnects the conductor $14^a$ from the side L of the supply circuit. The main contactor then opens the armature circuit of the motor causing the motor to stop, and any of the relays $2^a$, $3^a$, etc., which may have been closed will drop to open position by reason of the disconnection of the conductor $14^a$ through which the coils are fed when the relays are closed.

What I claim is:

1. In a speed regulating system for electric motors, an armature circuit, a resistance therein, means for operatively connecting the motor to the supply circuit, a series of speed regulating contactors adapted to cut in and out sections of said resistance, separate circuits for said contactors, a series of relays for closing the latter circuits, control circuits for said relays, an accelerating switch adapted to close said control circuits in succession, a decelerating switch adapted to open said control circuits in the reverse order of their closure, and means for actuating said accelerating and decelerating switches at will.

2. In a speed regulating system for electric motors, an armature circuit, a resistance therein, means for operatively connecting the motor to the supply circuit, a series of speed regulating contactors adapted to cut in and out sections of said resistance, separate circuits for said contactors, a series of relays for closing the latter circuits, control circuits for said relays, an accelerating switch adapted to close said control circuits in succession, a decelerating switch adapted to open said control circuits in the reverse order of their closure, electro-magnetic devices for actuating said accelerating and decelerating switches, circuits for said devices, and manually operated switches for closing the last mentioned circuits.

3. In a speed regulating system for electric motors, an armature circuit, a resistance therein, means for operatively connecting the motor to the supply circuit, a series of speed regulating contactors adapted to cut in and out sections of said resistance, separate circuits for said contactors, a series of relays for closing the latter circuits, control circuits for said relays, an accelerating switch adapted to close said control circuits in succession, a decelerating switch adapted to open said control circuits in the reverse order of their closure, electro-magnetic devices for actuating said accelerating and decelerating switches, means for retarding the movements of said latter switches, circuits for said devices, and manually operated switches for closing the last mentioned circuits.

4. In a speed regulating system for electric motors, an armature circuit, a resistance therein, means for operatively connecting the motor to the supply circuit, a series of speed regulating contactors and separate circuits therefor, a corresponding series of relays for closing said latter circuits, control circuits for the coils of said relays, an accelerating switch adapted to close said control circuits in succession, holding circuits in shunt to the accelerating switch adapted to be closed by said relays, a decelerating switch adapted to open said control circuits in the reverse order of their closure, electromagnetic devices for actuating said accelerating and decelerating switches, means for retarding the movements of said switches, circuits for said devices, and manually controlled switches for controlling said last mentioned circuits.

5. In a speed regulating system for electric motors, an armature circuit, a resistance therein, an electromagnetic contactor for operatively connecting the motor to the supply circuit, a relay for closing the circuit of said contactor, a circuit for said relay, manually operated switches for closing and opening the latter circuit, a series of speed regulating contactors for cutting in and out sections of the resistance, separate circuits for the contactors, a series of relays for closing the contactor circuits, separate control circuits for the latter relays, an accelerating switch adapted to close said control circuits in succession, a decelerating switch adapted to open said control circuits in the reverse order of their closure, and means for actuating said accelerating and decelerating switches at will.

6. In a speed regulating system for electric motors, an armature circuit, a resistance therein, an electromagnetic contactor for operatively connecting the motor to the supply circuit, a relay for closing the circuit of said contactor, a circuit for said relay, manually operated switches for closing and opening the latter circuit, a series of speed regulating contactors for cutting in and out sections of the resistance, separate circuits for the contactors, a series of relays for closing the contactor circuits, separate control circuits for the latter relays, an accelerating switch adapted to close said control circuits in succession, a decelerating switch adapted to open said control circuits in the reverse order of their closure, electromagnetic devices for actuating said accelerating and decelerating switches, means for retarding the movements of the last mentioned switches, circuits for said devices, and manually operated switches for closing the last mentioned circuits.

7. In a speed regulating system for electric motors, an armature circuit, a resistance therein, a main contactor for operatively connecting the motor to the supply circuit, a circuit for said main contactor, a series of speed regulating contactors for cutting in and out sections of the resistance, separate circuits for the latter contactors, separate relays in the circuits of the speed regulating contactors, separate control circuits for the latter relays, an accelerating switch adapted to close said control circuits in succession, a decelerating switch adapted to open said control circuits in the reverse order of their closure, means for actuating said accelerating and decelerating switches at will, a main relay adapted to connect the circuit of the main contactor and the circuits of the speed regulating contactors to the supply circuit, circuits for controlling said main relay, and manually operable switches in said last mentioned circuits.

In testimony whereof I affix my signature.

WILLIAM T. HOLMES.